US008092041B2

(12) United States Patent
Fowler, Jr. et al.

(10) Patent No.: US 8,092,041 B2

(45) Date of Patent: Jan. 10, 2012

(54) LOW PROFILE LINEAR HIGH BAY FLUORESCENT LUMINAIRE

(75) Inventors: Wilton L. Fowler, Jr., Spokane Valley, WA (US); David J. Rector, Spokane Valley, WA (US); William A. Ballweg, Greer, SC (US)

(73) Assignee: Hubbell Incorporated, Shelton, CT (US)

( * ) Notice: Subject to any disclaimer, the term of this patent is extended or adjusted under 35 U.S.C. 154(b) by 274 days.

(21) Appl. No.: 11/785,914

(22) Filed: Apr. 20, 2007

(65) Prior Publication Data

US 2008/0259599 A1 Oct. 23, 2008

(51) Int. Cl.
*B60Q 1/26* (2006.01)

(52) U.S. Cl. ........ 362/227; 362/404; 362/407; 362/362; 362/368; 362/373; 362/225

(58) Field of Classification Search .................. 362/227, 362/404, 407, 362, 368, 373, 225
See application file for complete search history.

(56) References Cited

U.S. PATENT DOCUMENTS 2,619,583 A 11/1952 Baumgartner
2,874,271 A 2/1959 Lipscomb
3,247,368 A 4/1966 McHugh
3,838,268 A 9/1974 Fabbri
4,435,744 A 3/1984 Russo
4,674,015 A 6/1987 Smith
4,814,954 A 3/1989 Spitz
4,876,633 A 10/1989 Engel
4,928,209 A 5/1990 Rodin
5,062,030 A 10/1991 Figueroa
5,111,370 A 5/1992 Clark
5,192,129 A 3/1993 Figueroa
5,220,250 A 6/1993 Szuba
5,357,170 A 10/1994 Luchaco et al.
5,803,589 A 9/1998 Lee (Continued)

FOREIGN PATENT DOCUMENTS

JP 2005158461 6/2005

OTHER PUBLICATIONS

E-conolight Instruction Manual for E-LN1F6X32U, et al., Dec. 19, 2006, four pages.

(Continued)

*Primary Examiner* — William Carter
(74) *Attorney, Agent, or Firm* — Garrett V. Davis; Mark S. Bicks; Alfred N. Goodman

(57) ABSTRACT

A low profile linear high bay fluorescent luminaire with a downwardly facing and room side accessible ballast channel. The lighting fixture includes a housing assembly having a longitudinal axis with a first reflector located on a first side of the longitudinal axis. A second reflector is located on a second side of the longitudinal axis. The first and second reflectors are spaced apart with at least one ballast therebetween. At least one ballast is coupled to the housing assembly and extends downwardly from the housing assembly. A cover for the ballast is located below the ballast. The lighting fixture also includes a means for releasably coupling the cover to the housing assembly. The lighting fixture can be suspended from a ceiling or joist in a number of ways including mounting brackets, wire hangers, and ceiling assemblies, and can have an occupancy sensor attached thereto.

32 Claims, 10 Drawing Sheets

U.S. PATENT DOCUMENTS

| | | | | |
|---|---|---|---|---|
| 6,059,424 | A | 5/2000 | Kotloff | |
| 6,091,200 | A | 7/2000 | Lenz | |
| 6,193,394 | B1 | 2/2001 | Herst et al. | |
| 6,218,787 | B1 | 4/2001 | Murcko et al. | |
| 6,428,183 | B1 | 8/2002 | McAlpin | |
| 6,758,580 | B1 * | 7/2004 | Verfuerth | 362/241 |
| 6,908,212 | B2 | 6/2005 | Schultz | |
| 7,111,957 | B2 * | 9/2006 | Bernhart et al. | 362/147 |
| 7,175,315 | B2 | 2/2007 | Eaton | |
| 2004/0218393 | A1 | 11/2004 | Brondt et al. | |
| 2005/0073838 | A1 | 4/2005 | Haugaard et al. | |
| 2005/0180131 | A1 | 8/2005 | Grimmeisen | |
| 2005/0201088 | A1 | 9/2005 | Stach et al. | |
| 2005/0281030 | A1 | 12/2005 | Leong et al. | |
| 2006/0023445 | A1 * | 2/2006 | Haugaard et al. | 362/225 |
| 2006/0232984 | A1 * | 10/2006 | Schuknecht et al. | 362/373 |

OTHER PUBLICATIONS

E-conolight Online Catalog for E-LN1F6X32U, www.e-conolight.com/Product, Jan. 19, 2007, one page.

* cited by examiner

FIG. 5
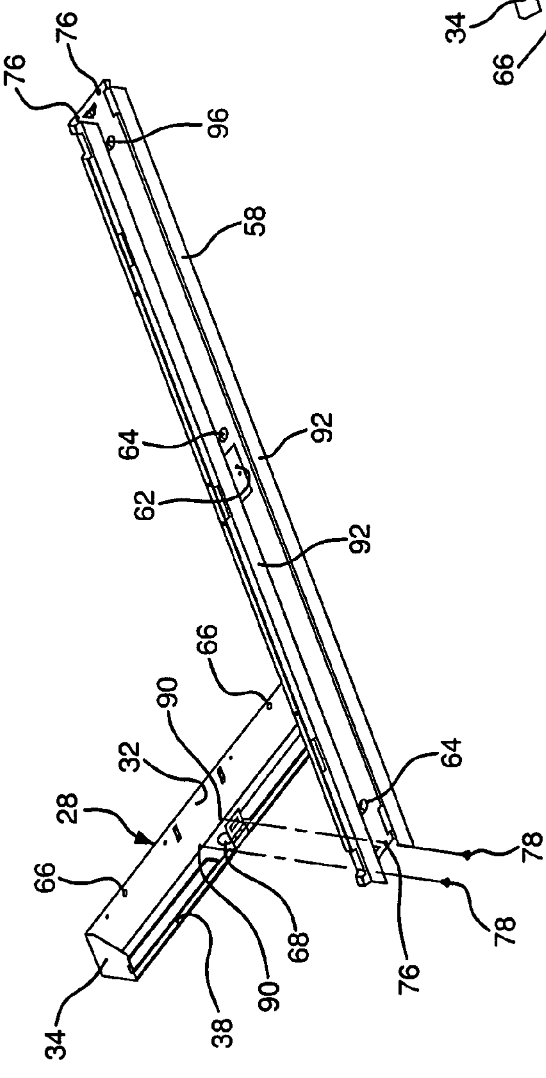
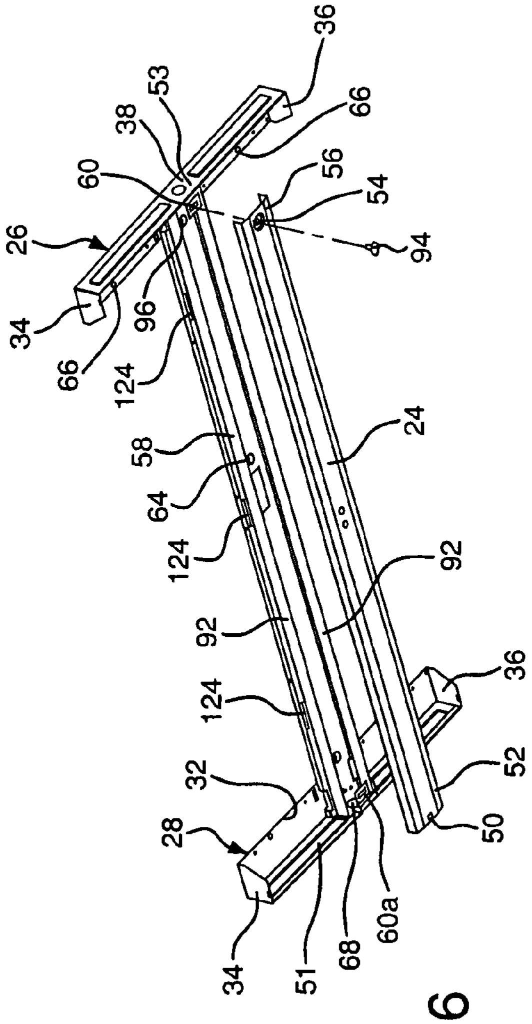
FIG. 6

LOW PROFILE LINEAR HIGH BAY FLUORESCENT LUMINAIRE

FIELD OF THE INVENTION

The present invention relates to a lighting fixture with a downwardly facing ballast designed to be accessed from below. More particularly, the invention relates to a high bay fluorescent luminaire having a center ballast assembly positioned below the top of the housing assembly, allowing a user to access the ballasts without removing the lamps, the reflectors or the luminaire from its suspended position and without using any tools to access the ballasts.

BACKGROUND OF THE INVENTION

Conventional fluorescent high bay lighting fixtures for retail and industrial applications are often mounted or suspended from ceiling joists high above the floor. The ballast assembly adjacent to first and second reflectors is only accessible from the top of the lighting fixture. There are often problems for installers and regular users who need to access the ballast assembly when a ballast needs repair or replacing. The entire high bay lighting fixture must be removed from the suspension mechanism to replace one or a plurality of ballasts, and often the lamps and reflectors must be removed.

One of the problems with existing high bay lighting fixtures is the height to which they are suspended from the ceiling and their sheer size that makes disassembly difficult. Subsequent to removing the lighting fixture from its mounting or ceiling suspension, the ballast can be replaced or repaired when the ballast channel cover is detached. However, this is a time consuming, dangerous, and labor intensive process conducted high above the floor.

Accordingly, a need exists for a room side accessible ballast assembly with a downwardly facing ballast channel.

SUMMARY OF THE INVENTION

Accordingly, an object of the present invention is to provide a lighting fixture having a room side accessible ballast.

Another object of the invention is to provide a lighting fixture having a center accessible ballast with at least one reflector adjacent to the longitudinal axis of the ballast.

A further object of the invention is to provide a lighting fixture having reflectors and a ballast assembly extending downwardly from the housing assembly.

Still another object is to provide a lighting fixture having a means for releasably coupling the ballast cover to the housing assembly.

Yet another object is to provide an occupancy sensor electrically-connected to the lighting fixture for activating the lamps when a user is near the lighting fixture.

The foregoing objects are basically attained by providing a lighting fixture comprising a housing having a longitudinal axis with a first reflector located on a first side of the longitudinal axis. A second reflector is located on a second side of the longitudinal axis. The first and second reflectors are spaced apart with at least one ballast therebetween. At least one ballast is coupled to the housing and extends downwardly from the housing. A cover for the ballast is located below the ballast. The lighting fixture also includes a means for releasably coupling the cover to the housing.

By forming the lighting fixture in this manner, a user can access the ballast channel and operate the lighting fixture without removing the lighting fixture from its suspended position or removing the lamps or reflectors. Moreover, the lighting fixture can be electrically operated when a user enters the room controlled by an occupancy sensor electrically connected to the lighting fixture.

As used in this application, the terms "top", "bottom", and "side" are intended to facilitate the description of the lighting fixture, and are not intended to limit the lighting fixture of the present invention to any particular orientation.

Other objects, advantages, and salient features of the present invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure:

FIG. 5 is an exploded bottom perspective view of one end of the lighting fixture seen in FIGS. 1-4 with the ballast channel detached showing the attachment means at one end and the reflectors and lamps removed;

FIG. 6 is an exploded bottom perspective view of the lighting fixture seen in FIGS. 1-5 with the reflectors and lamps removed and showing the ballast cover;

Throughout the drawings, like reference numerals will be understood to refer to like parts, components, and structures.

DETAILED DESCRIPTION OF THE INVENTION

Figure 1:
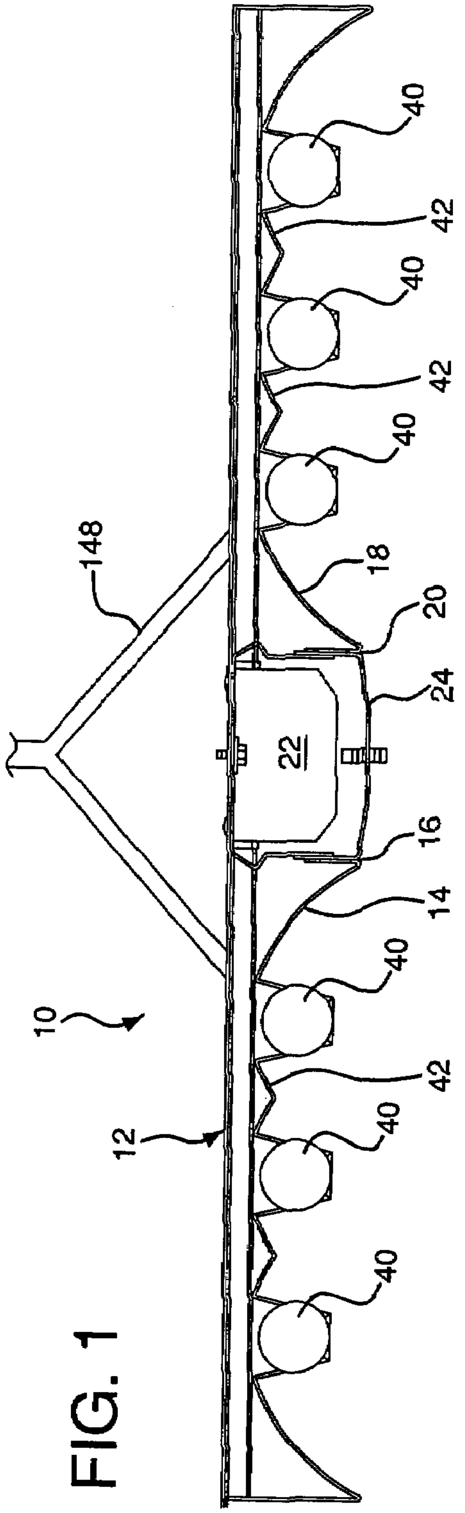
FIG. 1 is an elevational end view of the lighting fixture with the end caps removed according to an embodiment of the present invention and hanging from the ceiling with a suspension means.
Figure 2:
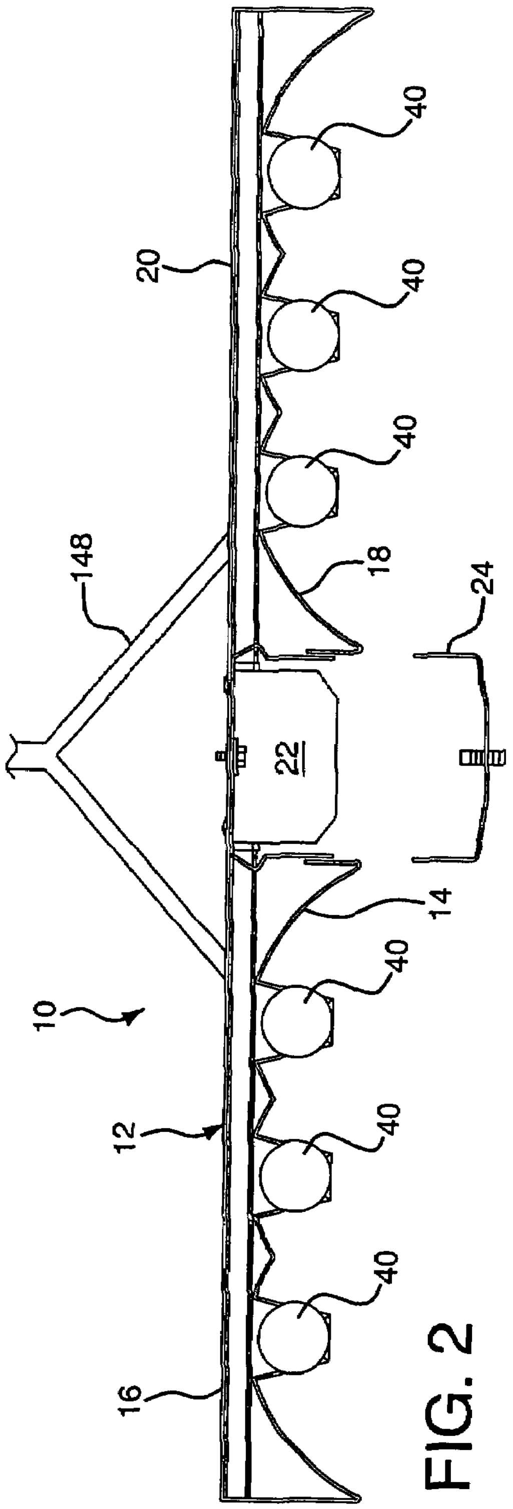
FIG. 2 is an elevational end view of the lighting fixture seen in FIG. 1 with the ballast cover removed exposing the ballast.
Figure 3:
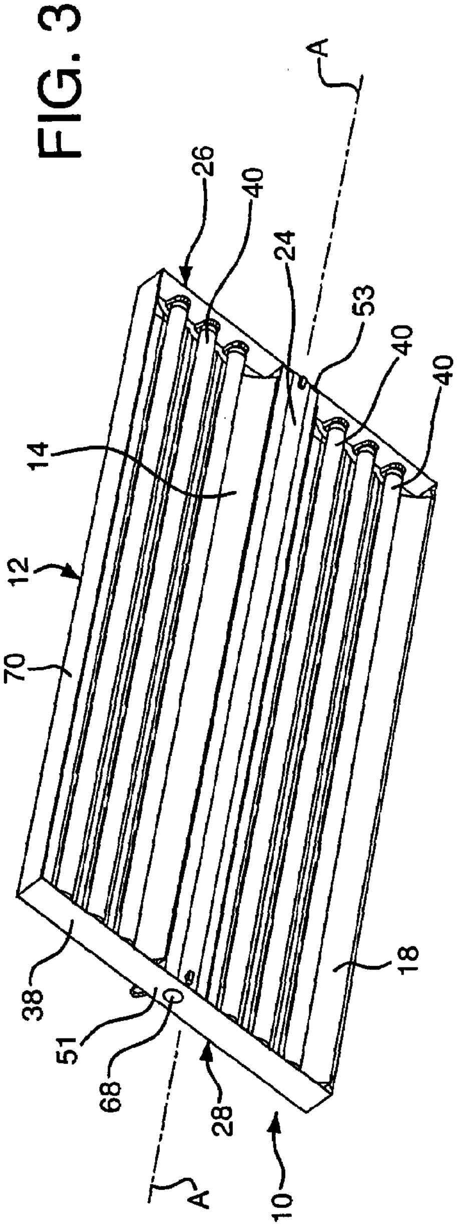
FIG. 3 is a bottom perspective view of the lighting fixture seen in FIGS. 1 and 2.

Turning to FIGS. 1-3, a lighting fixture 10 comprises a housing assembly 12 having a longitudinal axis A with a first reflector 14 on a first side 16 of the longitudinal axis and a second reflector 18 on a second side 20 of the longitudinal axis. The first and second reflector 14, 18 are spaced apart from each other by at least one ballast 22 coupled to the housing assembly 12. The ballast 22 extends downwardly from the housing assembly 12. A cover 24 for the ballast 22 is located below the ballast 22 along with a means for releasably coupling the cover 24 to the housing assembly 12, so that the ballast 22 is accessible from below the fixture 10.

Figure 4:
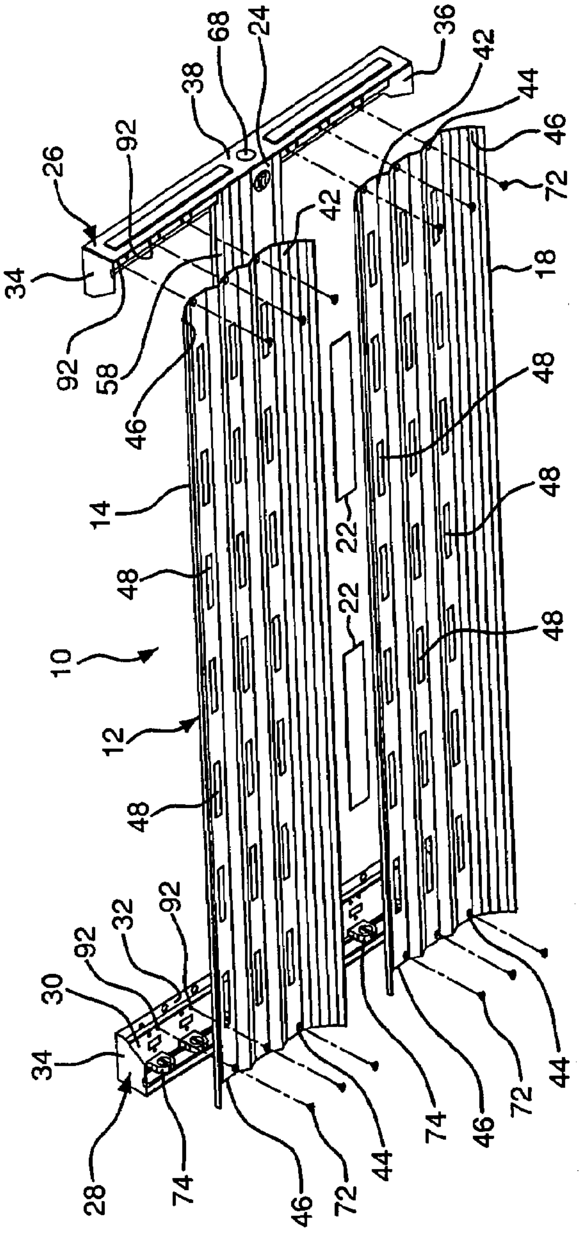
FIG. 4 is an exploded bottom perspective view of the lighting fixture seen in FIGS. 1-3.

As seen in FIG. 4, the reflectors 14, 18 are substantially arcuate dome-shaped structures oriented to include a plurality of lamps 40. The reflectors 14, 18 include an equal number of fluorescent lamps 40 on each side of the ballast 22 and located beneath each of the reflectors 14, 18. The body of each reflector 14, 18 is formed into a series of downwardly facing channels 42 arranged substantially parallel to the longitudinal axis A. Each channel 42 is adapted to receive one lamp 40. Each lamp 40 is releasably coupled to the housing assembly 12 adjacent and below each of the reflectors 14, 18.

The reflectors 14, 18 include a plurality of apertures 44 disposed along the horizontal axis of the reflector 14, 18 closest to the edge for receiving an attaching means such as a screw or substantial equivalent. Preferably, one aperture 44 would be disposed at the end of each channel 42 at an edge 46 perpendicular to the longitudinal axis A of the housing assembly 12.

Each channel 42 includes a series of light slots 48 towards the upper dome of the reflectors 14, 18. The light slots 48 are substantially rectangularly-shaped openings spaced apart an equidistant from each other along each individual channel 42 to provide a mechanism for uptight. The percentage of total light output of the lighting fixture 10 is relatively small.

At least one ballast 22 is disposed between the reflectors 14, 18 for electrically powering the lamps 40 in a conventional manner. Preferably, a plurality of ballasts 22 are arranged in a series along the longitudinal axis A of the fixture 10. The ballasts 22 are downwardly facing and contained within a ballast channel 58 disposed between first and second end caps 26, 28, respectively.

The ballast channel 58 is substantially U-shaped and downwardly facing to support the downwardly facing ballasts 22. Turning to FIGS. 5 and 6, the channel 58 includes an opening 62 towards its middle. Three circular apertures 64 are disposed along the longitudinal midline of the channel 58, preferably spaced an equal distance from each other. The ballast channel 58 includes at least one opening 76 at each end adjacent the first and second end caps 26, 28 and disposed adjacent to the outer edge of the ballast channel 58. The openings 76 can receive a mounting means for connecting the ballast channel 58 to the base 32.

The ballast channel 58 further includes a plurality of venting slots 124 along the longitudinal edge of the ballast channel 58. These venting slots 124 could be used for venting the housing assembly 12. The venting slots 124 help to prevent overheating in the space between the lamps 40 and the interior downwardly facing surface of the reflectors 14, 18. The venting slots 124 promote ventilation such as air convection, and thus cooling, for the ballasts 22.

The cover 24 is a substantially upwardly-opening, U-shaped longitudinal structure covering the side of the ballasts 22 opposite the ballast channel 58 and located between the reflectors 14, 18. The cover 24 includes a tab 50 towards a first end 52 of the housing assembly 12 and an aperture 54 towards a second end 56 of the cover 24. The tab 50 is substantially rectangularly-shaped with a multilevel interior such as a step or raised ridge. The aperture 54 is substantially circularly-shaped with a raised outer edge and receded interior edge adapted for receiving a fastener, such as fastener 94 as seen in FIG. 6. The housing assembly 12 includes a means for releasably attaching the cover 24 to the housing assembly 12 such as a plurality of screws or similar mechanism.

The housing assembly 12 further includes first and second end caps 26, 28 arranged substantially-perpendicular to the longitudinal axis A of the housing assembly 12. Each of the end caps 26, 28 includes a socket pan 30, a base 32, first and second edges 34, 36, and a side wall 38. The base 32 is perpendicular to the side wall 38, both meeting at an outer edge and forming a 90° corner piece with first and second edges 34, 36. The base 32 includes a plurality of openings 66 that are circularly-shaped and adapted to receive a mounting means. The socket pan 30 is located along the base 32 and transversely oriented with the side wall 38.

Moreover, each end cap 26, 28 includes a slot 60, **60*a* disposed approximately along the bottom edge of the side wall 38 and parallel to the base 32 of the housing assembly 12. Each slot 60, 60*a* is substantially rectangularly-shaped with two receiving apertures for accepting a variety of connecting means. The end caps 26, 28 also include a substantially circular-shaped aperture 68 disposed along the midline of the side wall 38** having a diameter large enough for receiving electrical wires.

Each of the end caps 26, 28 includes a series of lamp holders 74 attached to the base 32. Specifically, the lamp holders 74 are substantially D-shaped clips arranged lengthwise along the socket pan 30 adapted to connect to the lamps 40. Each end cap 26, 28 includes the same number of lamp holders 74 attached to each socket pan 30 as there are lamps 40 located beneath the reflectors 14, 18.

The side of the housing assembly 12 is lined with rails 70 disposed between each end cap 26, 28. The rails 70 are oriented parallel to the longitudinal axis A and perpendicular to each end cap 26, 28. The rails 70 are located on the outermost edge of each reflector 14, 18 opposite the edges adjacent to the ballast channel 58.

In a further embodiment, illustrated in FIGS. 20-23, the housing assembly 12 includes an occupancy sensor 80 attached to the side wall 38 of an end cap 28. The occupancy sensor 80 is adapted to be electrically coupled to the lamps 40 for controlling their activation when a user is near the lighting fixture 10. The occupancy sensor 80 includes a bracket 82 having at least one clip 84 at a first end and at least one tab 86 at a second end. The clip 84 is latched beneath the side wall 38 of the end cap and the tab 86 grips the base 32. The sensor 80 is electrically powered to the housing assembly 12 with wiring 80 extending between the bracket 82 and the ballasts 22.

Assembly

The housing assembly 12 is assembled with the ballast channel 58 attached to the end caps 26, 28 by aligning the channel apertures 76 with apertures 90 along the base 32. Each exterior edge of the ballast channel 58 is flush with the corners of each end cap 26, 28. The ballast channel openings 76 are aligned with the base apertures 90 for receiving a mounting means such as a plurality of screws 78 threaded therein to connect the ballast channel 58 to the end caps 26, 28.

The reflectors 14, 18 are attached to the housing assembly 12 by aligning the interior edge of the first reflector 14 with the U-shaped ballast channel 58 along the first side 16 and the interior edge of the second reflector 18 with the ballast channel 58 along the second side 20. When the exterior edges 46 of each reflector 14, 18 are aligned with each end cap 26, 28, a plurality of screws 72 or similarly situated mounting means are threaded through the reflector apertures 44 and into a plurality of end cap apertures 92.

Turning to FIGS. 15-19, the side rails 70 are attached to the housing assembly 12 with a screw 98 threaded into an opening in the side rail 70 closest to the edge of the end caps 26, 28. The side rails 70 are substantially U-shaped structures with the longest side of the U-shape placed against the end caps 26, 28 such that the short arms of the U-shape grip the end cap 26, 28. A slot 156 along the bottom edge of the side rail 70 is separated from the remaining edge of the side rail 70 and engages an opening 158 in the end cap 26.

The plurality of downwardly facing ballasts 22 are contained in the ballast channel 58 and arranged in a series along the longitudinal axis A of the housing assembly 12. The ballasts 22 are enclosed by a protective ballast cover 24 located below the ballasts 22 opposite the ballast channel 58. The cover 24 is releasably coupled to the housing by aligning the shorter sides of the cover 24 around the side rails 70 of the channel 58 as seen in FIG. 1. The fastener 94, as seen in FIG. 6, is inserted into the cover aperture 54 at the second end 56 of the cover 24 and engages a channel opening 96 in a second end of the housing 53. At the first end 51 of the housing assembly 12, the cover 24 is releasably coupled to the housing assembly 12 with the tab 50 at the first end 52 of the cover 24 and the slot 60 along the base side wall 38. Twisting the fastener 94 locks the cover 24 to the channel 58 at the second end 53 of the housing assembly 12.

The lamps 40 are attached to the housing assembly 12 by connecting each lamp 40 to a lamp holder 74 disposed along the surface of the base 32. The lamps 40 are individually aligned in lamp channels 42 parallel to the longitudinal axis A of the housing assembly 12. The lamp holder 74 attachment to the socket pan 30 supplies electrical power to the lamps 40.

If included with the housing assembly 12, the occupancy sensor 80 is mechanically attached to one of the end caps 26, 28 and electrically connected to the lamps 40 in a conventional manner. The electrical wiring 88 passes through an opening 68 in the end cap 28. Once the wiring 88 is connected, the bracket 82 is aligned with the side wall 38 of the end cap 28. Preferably two clips 84 attach to the lower end of the bracket 82, one clip 84 clasped around each side for latching beneath the side wall 38. The upper end of the bracket 82 includes at least one tab 86, but preferably two tabs 86 gripping the base 32 of the end cap 28. The tabs 86 snap over the end cap screws 78 which protrude through slotted openings 87 in the tabs 86 to further secure the sensor 80 to the base 32.

Figure 9:
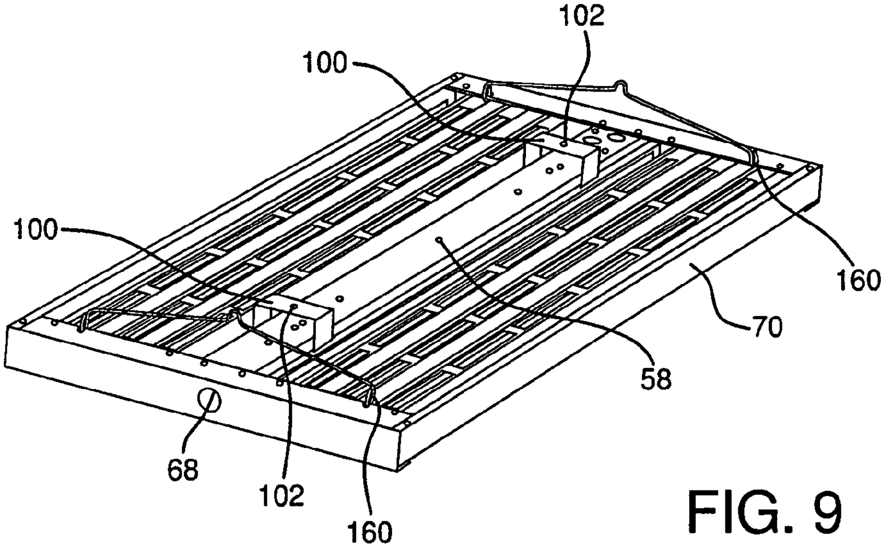
FIG. 9 is a top perspective view of the lighting fixture according to a fourth embodiment with an optional mounting bracket attached to the ballast channel.
Figure 13:
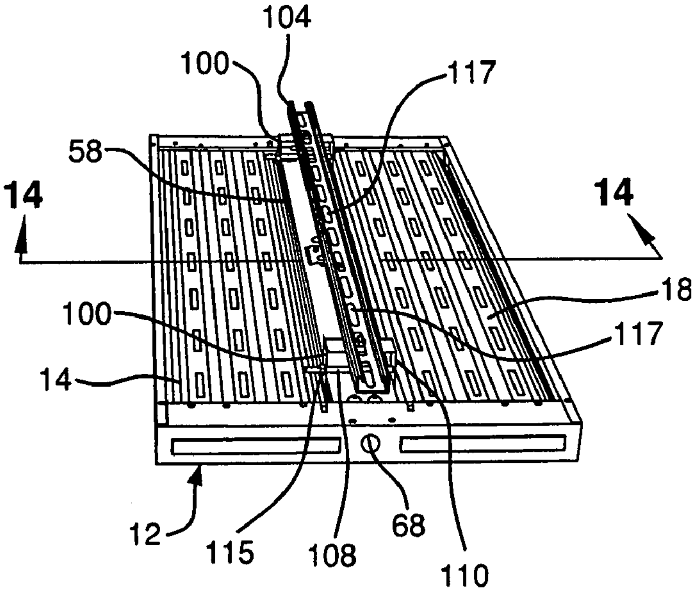
FIG. 13 is a top perspective view of a mounting channel attached to first and second mounting brackets according to a sixth embodiment.
Figure 14:
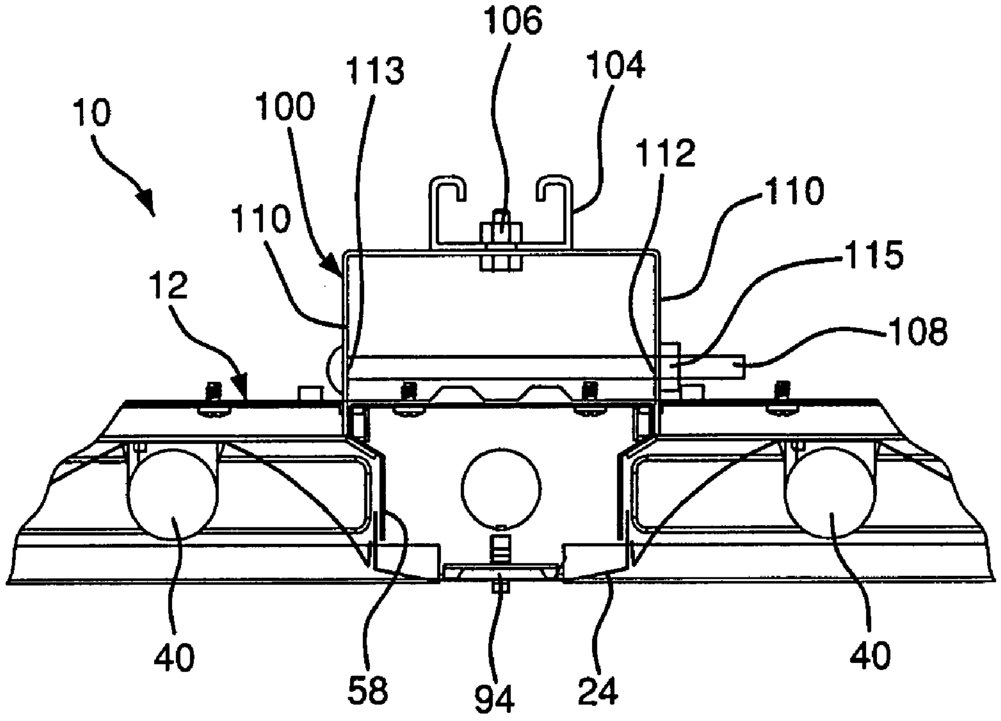
FIG. 14 is a sectional view of the mounting bracket as seen in FIG. 13 along line 14-14.
Figure 15:
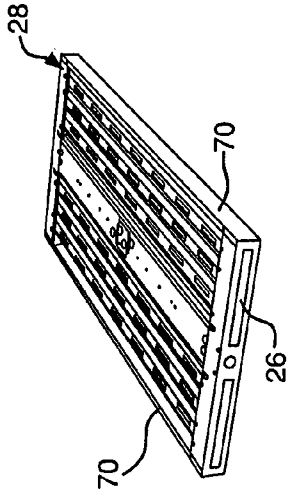
FIG. 15 is a top perspective view of a lighting fixture according to a seventh embodiment of the invention having side rails attached to the housing.
Figure 16:
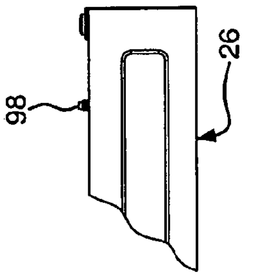
FIG. 16 is a side elevational view of the end cap and side rail connection of the lighting fixture as seen in FIG. 15.
Figure 17:
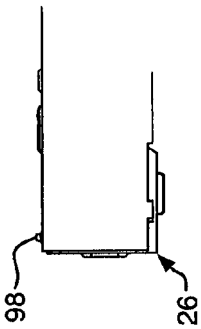
FIG. 17 is a side elevational view of the end cap and side rail connection of the lighting fixture with the opposite side of that illustrated in FIG. 16.
Figure 18:
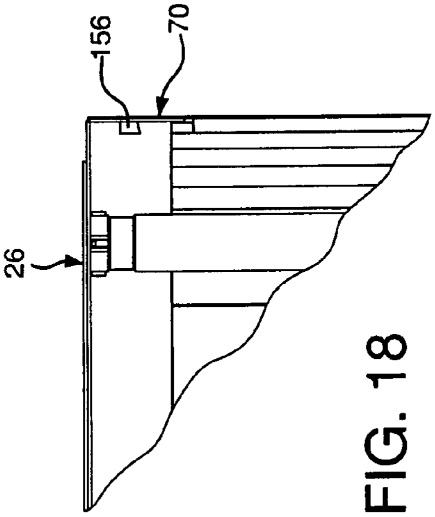
FIG. 18 is a bottom elevational view of the end cap and side rail connection of the lighting fixture as seen in FIGS. 15-17.
Figure 19:
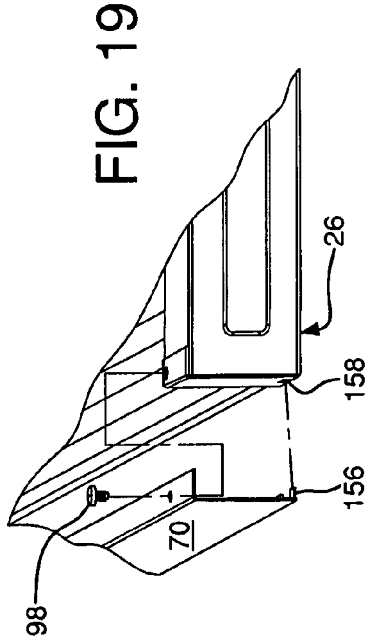
FIG. 19 is an exploded side perspective view of the end cap and side rail as seen in FIGS. 15-18.
Figure 20:
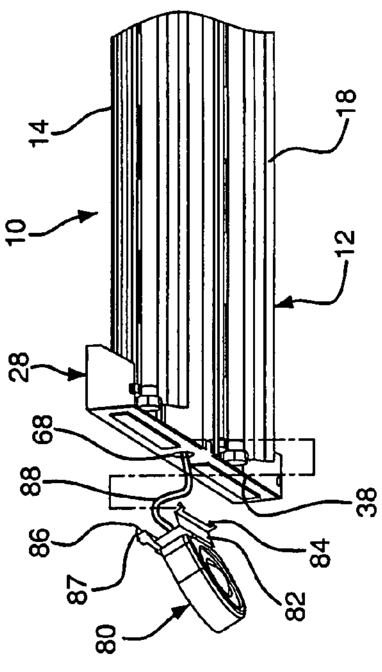
FIG. 20 is a side perspective view of the lighting fixture having an occupancy sensor attached to the housing according to an eighth embodiment of the invention.
Figure 21:
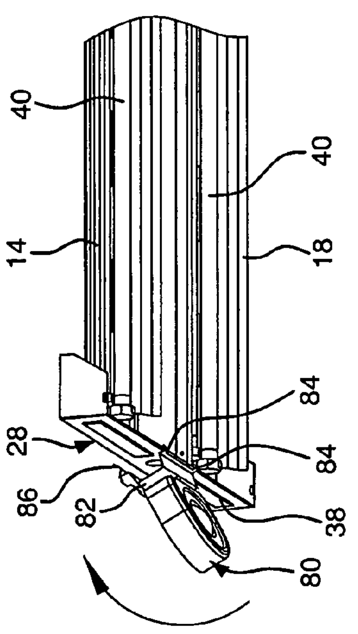
FIG. 21 is a side perspective view of the lighting fixture seen in FIG. 20 with the occupancy sensor bracket partially attached to the end cap.
Figure 22:
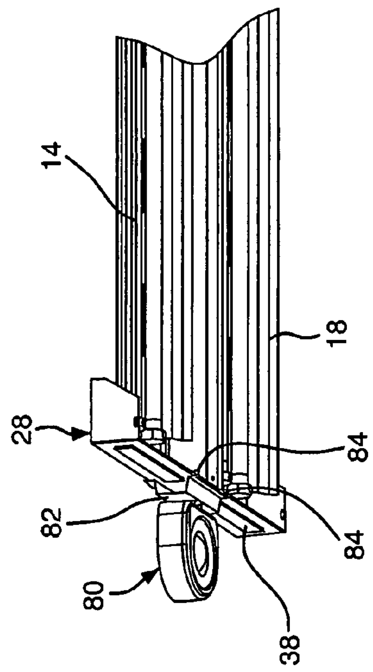
FIG. 22 is a side perspective view of the lighting fixture seen in FIGS. 20 and 21 with the occupancy sensor bracket attached to the end cap.
Figure 23:
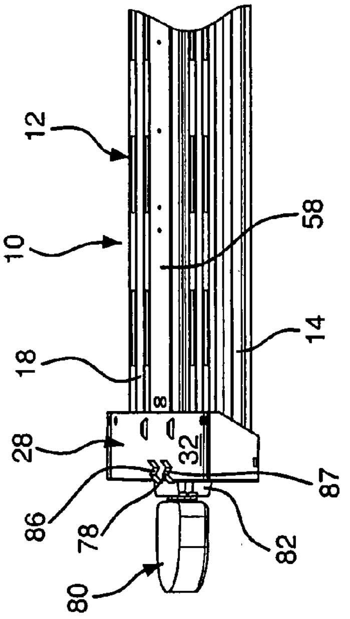
FIG. 23 is a top perspective view of the lighting fixture seen in FIGS. 20-22 with the screw engaged at the base of the end cap.

Once the housing assembly 12 is completely assembled, the lighting fixture 10 can be suspended from the ceiling or joist with a variety of devices. Turning to FIGS. 9, 13 and 14, a plurality of mounting brackets 100 are disposed at any position along the ballast channel 58. Preferably, the brackets 100 are attached towards the ends of the ballast channel 58 with one mounting bracket 100 closest to each end.

The mounting brackets 100 are substantially U-shaped with a circularly-shaped opening 102 along the top of the bracket 100. A subsequent mounting channel 104 is inverted with respect to the U-shaped bracket 100 and connected to the tops of the brackets 100. The mounting channel 104 is aligned parallel to the longitudinal axis A of the housing assembly 12.

Each mounting bracket 100 is attached to the channel 104 with a screw 106 passing through the circularly-shaped opening 102 and engaging first and second carriage openings 112, 113 of the mounting channel 104 and the bracket 100. The mounting channel 104 can include a series of openings 117 disposed evenly along the longitudinal axis of the channel 104. With this configuration, the housing assembly 12 could be attached to the channel 104 at a plurality of openings 117 rather than being committed to specific locations.

To further secure the mounting bracket 100, a carriage bolt 108 engages the sides 110 of the mounting bracket 100 that extend parallel to each other. The carriage bolt 108 passes from a first side 110 of the mounting bracket through the bottom of the U-shape and into a second side 110. The carriage bolt 108 is secured with a nut 115 threaded onto its body between first and second carriage openings 112, 113 until the nut 115 is directly adjacent to the side 110 of the mounting bracket 100.

Figure 10:
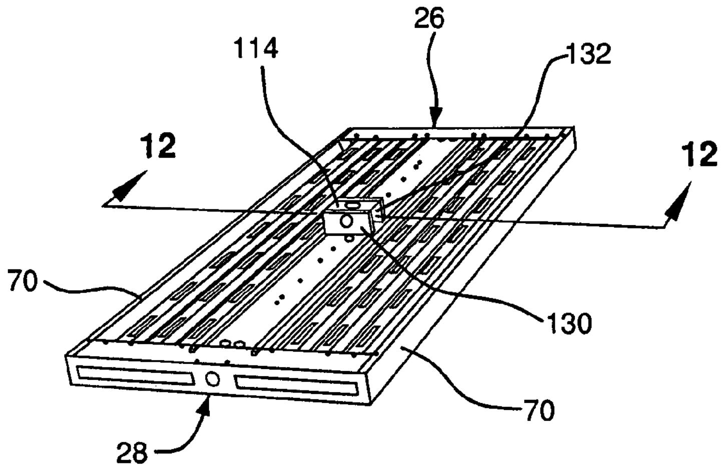
FIG. 10 is a top perspective view of the lighting fixture according to a fifth embodiment with a single point mounting at the center of the ballast channel.
Figure 11:
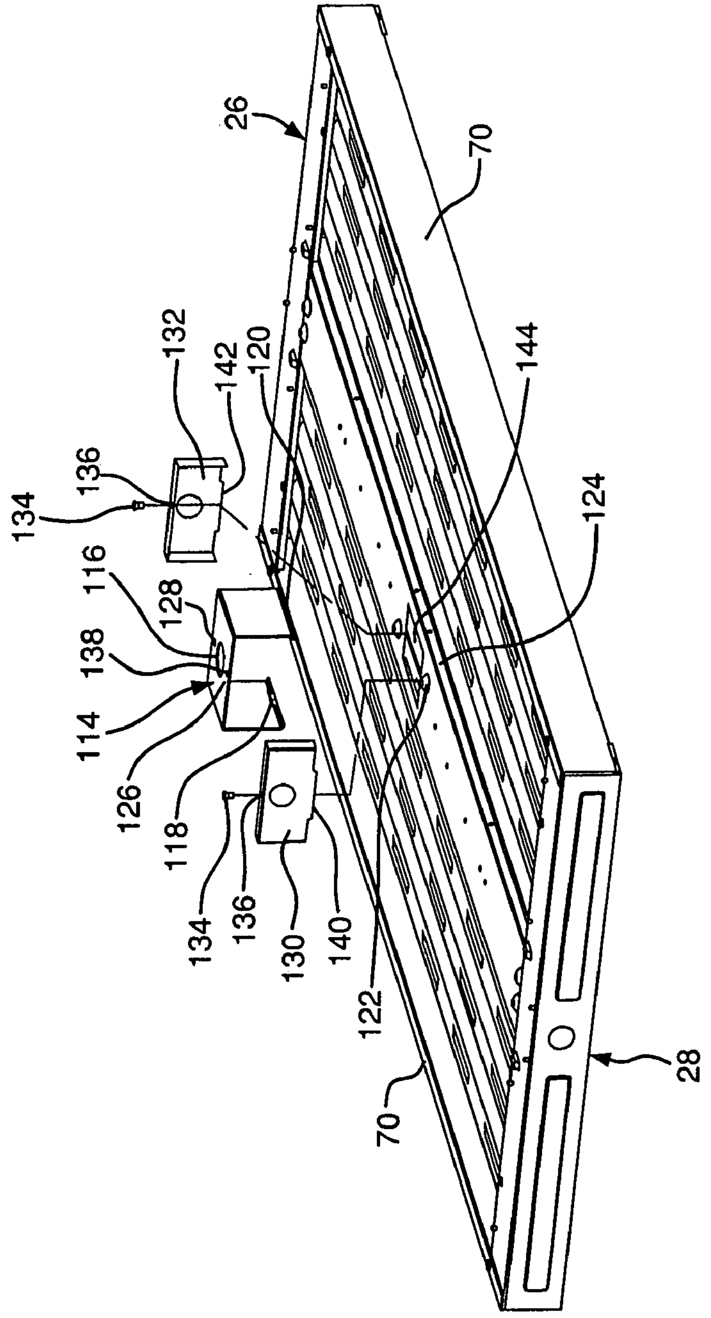
FIG. 11 is a side perspective view of the lighting fixture of FIG. 10 with an exploded view of the mounting bracket.
Figure 12:
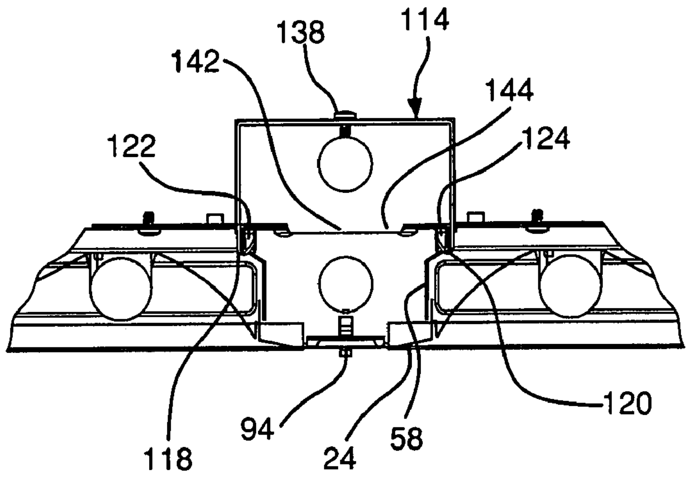
FIG. 12 is a sectional view of the mounting bracket as seen in FIG. 10 along line 12-12.

In another embodiment, a central mounting bracket 114 can be attached to the middle of the ballast channel 58, as seen in FIGS. 10-12. In this regard, the U-shaped mounting bracket 114 includes first and second edges 126, 128, a circularly-shaped opening 116, and first and second side tabs 118, 120 disposed along the bottom of the bracket 114. The first and second side tabs 118, 120 respectively engage a first slot 122 and a second slot 124 along the longitudinal edge of the ballast channel 58.

The mounting bracket 114 is attached at first and second edges 126, 128 to a first bracket end cap 130 and a second bracket end cap 132. The bracket end caps 130, 132 are flat ends to close off the opening of the U-shaped mounting bracket 114, as seen in FIG. 10. Further, the bracket end caps 130, 132 each have an end cap screw 134 threaded through an end cap aperture 136 atop each bracket end cap 130 to a bracket aperture 138 adjacent each of the edges 126, 128, respectively.

Bracket end cap 130 includes a first tab 140 at the bottom of the end cap 130 to engage a substantially rectangularly-shaped opening 144 in the ballast channel 58. A second bracket end cap 132 includes a second tab 142 at the bottom of the end cap 132 to engage the opposite side of the opening 144 in the ballast channel 58.

Once the mounting bracket 114 is attached to the ballast channel 58, the mounting bracket 114 can be connected to a ceiling joist by a screw or similar mounting means threaded between the circularly-shaped opening 116 and the respective ceiling joist. Preferably, the mounting bracket 114 suspends the fixture 10 from a single means through an opening 116 in the bracket 114. This can be a power feed location. When additional stability is required, cable hangers (such as those described below and illustrated in FIG. 8) are provided.

Figure 8:
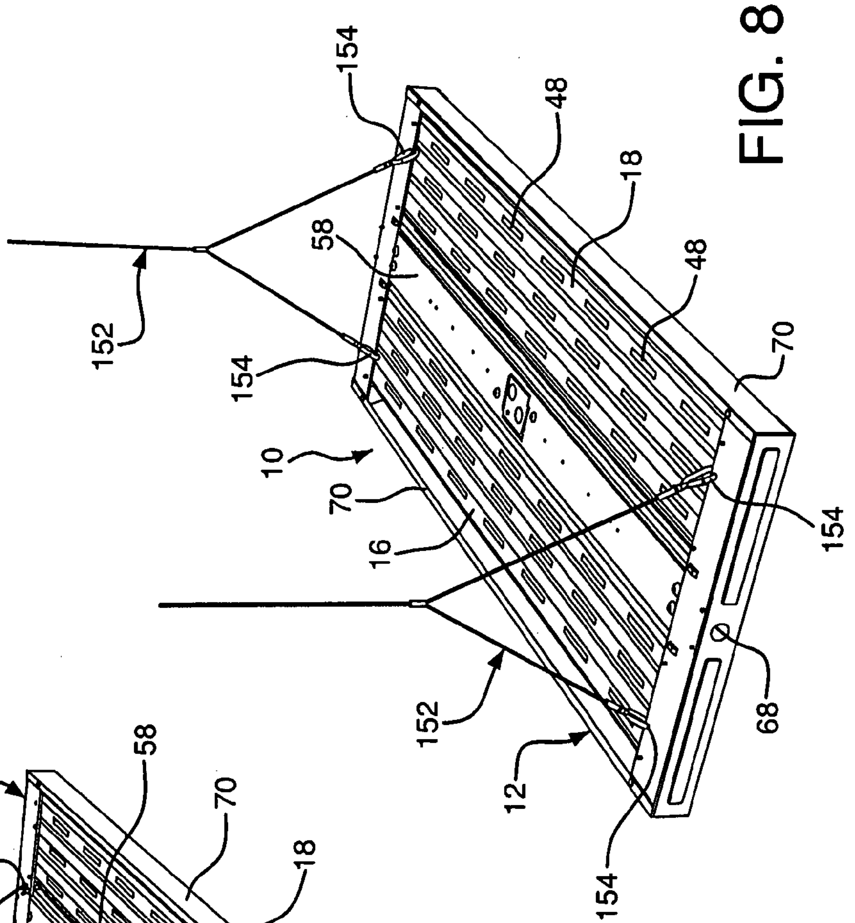
FIG. 8 is a top perspective view of the lighting fixture suspended with cable hangers according to a third embodiment of the invention.
Figure 7:
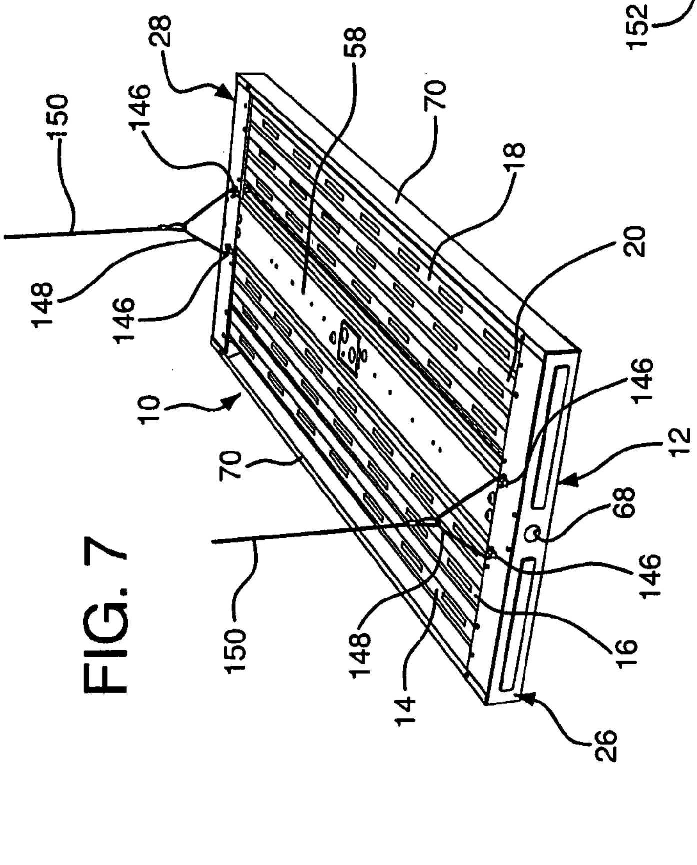
FIG. 7 is a top perspective view of the lighting fixture suspended with a wire form hanger attached to a cable or chain hanger for suspension according to a second embodiment of the invention.

FIGS. 7 and 8 illustrate additional embodiments with respect to the suspension of the lighting fixture 10. As seen in FIG. 7, the lighting fixture 10 is attached to a hanger apparatus

148 at the first end cap 26 and second end cap 28. The base 32 includes loop lances 146 disposed along the edge of the base 32 separated a distance that exceeds the width of the ballast channel 58. The loop lances 146 receive wire hangers 148 with an end engaging each loop lance 146. The wire hangers 148 are arranged at an angle from the loop lances 146 to form a substantially triangular shape between the top of the hanger 148 and the top of the base 32. The upper angles of the hangers 148 are connected to cables 150 suspended from the ceiling.

Turning to FIG. 8, the lighting fixture 10 is attached to a cable assembly 152 with a substantially triangular orientation between additional openings 154 on the base. The openings 154 receive hooks attached to the ends of the cable 152.

Operation

To operate the lighting fixture 10, ballasts 22 are assembled into the ballast channel 58. Optionally, if the occupancy sensor 80 is attached to the end cap 28, when a user enters a room, the occupancy sensor 80 will be activated and it will trigger the lamps 40 to power on. The wiring between the occupancy sensor 80 and the end cap 28 will transmit power to the ballasts 22 in the ballast channel 58. The ballasts 22 will transport power to the socket pan 30. Electrical power will then be transported from the socket pan 30 to activate the lamps 40 supported by the lamp holders 74. The light emitted by the lamps 40 will be reflected by the first reflector 14 along the first side 16 of the housing assembly 12 and the second reflector 18 along the second side 20 of the housing assembly 12. Optionally, if slots 48 are present in either of the reflectors 14, 18, a small percentage of the total light emitted by the lamps 40 will be upwardly directed.

Eventually, when the ballasts 22 expire causing the lamps 40 to deactivate, an installer can access the ballast channel 58 from the room side of, i.e., below, the lighting fixture 10. The orientation of the ballast cover 24 and the reflectors 14, 18 adjacent to the ballast channel 58 enables a user to quickly and easily replace the ballasts 22. Without requiring any tools, the user can rotate the fastener 94 from the cover aperture 54. Once the fastener 94 is rotated, it unlatches from the slot 60 in end cap 38 and is retained in the cover aperture 54. Then, the user disengages tab 50 from the second slot 60*a* and pivots the cover 24 away from the second end cap 28 and thus the ballast channel 58. When the cover 24 is completely detached from end cap 28, the ballasts 22 can be replaced. Optionally, the cover 24 can be rotated 180° and attached to the ballast channel 58 such that the fastener 94 engages the second slot 60*a* or the tab 50 engages the first slot 60.

The cover 24 is reinstalled by connecting the tab 50 to the slot 60 adjacent the side wall 38. Once the slot 60 is engaged, the cover 24 is pivoted upwardly towards the ballast channel 58. The fastener 94 is rotated through the ballast cover aperture 54 and connected to the housing assembly 12.

The lighting fixture 10 can be suspended from a ceiling or joist using any one of the disclosed embodiments above. The lighting fixture 10 can be suspended with wire hangers 148 or a cable assembly 152. Also, the lighting fixture 10 can be suspended with a substantially-open mounting bracket 100 or a substantially-closed mounting bracket 114, preferably attached to a mounting channel 104. As seen in FIG. 9, the mounting bracket 100 can be included with an additional style of wire hangers 160.

While a particular embodiment has been chosen to illustrate the invention, it will be understood by those skilled in the art that various changes and modifications can be made therein without departing from the scope of the invention as defined in the appended claims.

What is claimed is:

1. A lighting fixture comprising:

a housing assembly including a first end housing member, a second end housing member and a ballast channel extending between said first and second end housing members, each of said first and second end housing members having a base defining a top wall and a downwardly extending side wall, a plurality of spaced apart lamp bases coupled to a socket pan, said socket pan being coupled directly to each said base on a first side of said ballast channel and a plurality of lamp bases coupled to said base on an opposite side of said ballast channel, said housing assembly having a longitudinal axis with a first reflector located on a first side of said longitudinal axis and a second reflector located on a second side of said longitudinal axis, said first and second reflector being spaced apart, said ballast channel and first and second reflectors being contiguous and mounted directly to said base of said first and second end housing members, said reflectors having longitudinal ends being spaced from said lamp bases;

at least one ballast coupled to said ballast channel of said housing assembly, located between said first and second reflectors, and extending downwardly from said housing assembly; and a cover removably coupled to said ballast channel and directly to said side walls of said first and second end housing members, said ballast housing having a top wall, first and second downwardly extending side walls, and an open bottom side closed by said cover.

2. A lighting fixture according to claim 1, and further comprising means for releasably coupling said cover directly to said first and second end housing members of said housing assembly.

3. A lighting fixture according to claim 2, wherein said means for releasably coupling said cover to said housing assembly includes a tab on said cover at a first end of said cover and an inwardly extending tab having a slot at a bottom edge of said side wall of said first end housing member for receiving said tab on said cover.

4. A lighting fixture according to claim 3, wherein said means for releasably coupling said cover to said housing assembly further includes an opening in a tab extending from said side wall of said second end housing member, an aperture in a second end of said cover, and a fastener receivable in said opening and in said aperture.

5. A lighting fixture according to claim 1, and further comprising an occupancy sensor mounted to said first end housing member adapted to be electrically coupled to said lamps for controlling activation of said lamps; and means for coupling said occupancy sensor to said housing assembly.

6. The lighting fixture of claim 1, wherein each said reflector has a length to extend between said lamp bases on said base of said first end housing member and said base on said second housing member, said reflector having a plurality of recessed channels extending longitudinally with respect to said reflector, each said recessed channel being aligned with a respective lamp base and corresponding lamp and each said recessed channel having a plurality of openings spaced longitudinally along said recessed channel to allow a predetermined amount of light to pass upwardly through said reflector.

7. The lighting fixture of claim 1, wherein
said ballast channel has first and second open longitudinal ends and where said side walls of said first and second end housing members close the open ends of said ballast channel.

8. A lighting fixture comprising:
first and second end caps having a base forming a top wall, a side wall extending downwardly from said base, and first and second longitudinal ends, said base of said end caps connected directly to a ballast assembly extending downwardly therebetween, said ballast assembly including a ballast channel having a downwardly open bottom side and being coupled directly to said base of each of said end caps;
first and second reflectors disposed respectively alongside and contiguous with first and second longitudinal edges of said ballast assembly and mounted directly to said base of each respective end cap; and
a plurality of lamp bases mounted on each said bases of said end caps at opposite ends of said first reflector and having fluorescent lamps overlying said first reflector, and a plurality of lamp bases on each said bases of said end caps at opposite ends of said second reflector and having a plurality of fluorescent lamps overlying said second reflector, each of said lamps received within said end caps, said reflectors having longitudinal ends spaced from said lamp bases and having a plurality of longitudinal extending openings for allowing a predetermined amount of light to be directed upwardly.

9. A lighting fixture according to claim 8, wherein
said ballast assembly includes a plurality of ballasts contained therein and a removable ballast channel cover to close said open bottom side of said ballast channel and coupled to said first and second end caps.

10. A lighting fixture according to claim 9, wherein
said ballast channel includes at least one opening at each end adjacent said first and second end caps for receiving a mounting screw threaded into said base of said end caps.

11. A lighting fixture according to claim 9, wherein
said ballast channel cover includes an opening at one of said ends adapted for receiving a fastener.

12. A lighting fixture according to claim 9, wherein
said ballast channel cover includes a tab at one of said ends engaging a slot disposed along a bottom edge of said side wall of said end cap, and extending perpendicular to said side wall.

13. A lighting fixture according to claim 9, and further comprising
a U-shaped mounting bracket having first and second edges, a circular opening, and first and second side tabs disposed at a bottom edge of said mounting bracket and respectively engaging first and second slots along said longitudinal edge of said ballast channel.

14. A lighting fixture according to claim 13, wherein
said mounting bracket is attached at first and second edges to first and second bracket end caps, each having an end cap screw threaded through an end cap aperture of said bracket end cap to a bracket aperture adjacent each of said edges.

15. A lighting fixture according to claim 14, wherein
each of said bracket end caps further includes an end cap tab at a bottom edge of said bracket end cap inserted into a substantially rectangular opening in said ballast channel.

16. A lighting fixture according to claim 9, wherein
a U-shaped mounting bracket further includes a mounting channel connected to said mounting bracket by a screw threaded therebetween at a circularly-shaped opening.

17. A lighting fixture according to claim 16, wherein
said mounting bracket includes first and second carriage openings and receives a carriage bolt therebetween; and
a nut is threaded onto said carriage bolt to lock said bolt between said first and second carriage openings.

18. A lighting fixture according to claim 8, wherein
said ballast assembly includes a plurality of slots on opposite longitudinal edges of said ballast channel.

19. A lighting fixture according to claim 8, wherein
said first and second end caps are connected to each other via first and second side rails coupled to said longitudinal ends of said end caps, each of said side rails extending parallel to said ballast channel and disposed alongside a side edge of said reflectors opposite said ballast channel.

20. A lighting fixture according to claim 8, wherein
each of said reflectors having a plurality of longitudinally extending recessed channels aligned with a respective lamp base and lamp, said longitudinal extending openings in said reflectors being formed in said channels, and wherein
an equal number of said fluorescent lamps are provided on each side of said ballast assembly and located beneath each of said reflectors.

21. A lighting fixture according to claim 8, wherein
an occupancy sensor is attached to a side wall of one of said end caps, said occupancy sensor having a bracket with at least one clip at a bottom end and at least one tab at a top end, said clip is latched beneath said side wall of said end cap and said tab grips said base; and
an end cap screw protrudes into an opening in said tab to connect said occupancy sensor to said base.

22. The lighting fixture of claim 8, wherein
the ballast channel has a top wall coupled directly to said base of said end caps, and open longitudinal ends closed by said side walls of said end caps.

23. The lighting fixture of claim 22, wherein
each of said side walls of said end caps have a bottom edge with an inwardly extending tab, said fixture further comprising a ballast cover coupled directly to said tabs and closing said open bottom side of said ballast channel.

24. The lighting fixture of claim 8, wherein said ballast assembly includes a ballast channel comprising
a top wall having a longitudinal dimension and being coupled directly to said base of said first and second end caps;
first and second side walls extending downward from longitudinal side edges of said top wall of said ballast channel and defining said open bottom side; and
first and second open longitudinal ends, said open longitudinal ends mating with said side wall of a respective end cap to close said open longitudinal ends.

25. The lighting fixture of claim 24, wherein
said side walls of said ballast channel have a height substantially the same as a height of said side walls of said end caps.

26. A lighting fixture comprising:
first and second end caps, each having a base forming a top wall, a side wall extending downwardly from said base and extending transversely with respect to said lighting fixture, each said end cap having first and second ends, said base of said end caps connected directly to a ballast channel extending therebetween, each said side wall having a bottom edge opposite said base, said ballast channel having a top wall coupled to said base, opposite side walls extending downward and forming an open bottom side and open longitudinal ends, said open longitudinal ends being adjacent to and closed by said side walls of said end caps;

a ballast channel cover having longitudinal ends directly coupled to a bottom edge of a respective side wall of said end caps;

first and second reflectors located respectively on and contiguous with first and second sides of said ballast channel and mounted directly to said base of said end caps by fasteners extending through said first and second reflectors into said respective base;

a plurality of lamp bases coupled to each of said bases and a plurality of lamps on opposite sides of said ballast channel and overlying said first reflector and said second reflector, each of said lamps received within said end caps; and an occupancy sensor attached to said side wall of one of said end caps.

27. A lighting fixture according to claim 26, wherein said ballast channel cover having an opening at a first end adapted for receiving a fastener for coupling to said bottom edge of said first end cap and a tab opposing a second end, said tab engaging a slot disposed in a tab extending perpendicular to said side wall of said second end cap.

28. A lighting fixture according to claim 26, wherein said occupancy sensor includes a bracket having at least one clip at a bottom end and at least one tab at a top end, said clip is latched beneath said side wall of said end cap and said tab grips said base; and an end cap screw extending through an opening in said tab to connect to said base.

29. A lighting fixture comprising:

first and second end caps each having a base forming a top wall and a side wall extending downwardly from said base and having a bottom edge;

a ballast channel assembly extending between said end caps and having a top wall coupled directly to said base by fasteners, said ballast channel assembly including a ballast channel covered by a ballast channel cover with a plurality of ballasts contained therein, and said ballast channel cover including an opening at a first end adapted for receiving a fastener and being coupled to a tab on said bottom edge of said side wall of said first end cap, and a tab at an opposing second end engaging a slot in a flange extending from said bottom edge of said side wall of said second end cap;

first and second reflectors disposed alongside and contiguous with a longitudinal edge of said ballast channel assembly and directly mounted to said base of said end caps;

a plurality of lamps inserted into a series of lamp holders arranged lengthwise along a socket pan, said socket pan being mounted on said base of said end caps, a plurality of said lamps overlying said first reflector and a plurality of said lamps overlying said second reflector; and an occupancy sensor attached to one of said side walls of said end caps with a bracket having at least one clip at a bottom end and at least one tab at a top end, said clip being latched beneath said end cap and said tab gripping said end cap with an end cap screw extending through a tab opening into said base.

30. The lighting fixture of claim 29, wherein said side walls of said first and second end housing members have an inwardly extending tab, and where said cover is coupled directly to said tab.

31. The lighting fixture of claim 29, wherein said ballast channel has an open bottom side closed by said cover, and open longitudinal ends closed by said side walls of said first and second end housing members.

32. The lighting fixture of claim 31, wherein said base of said end housing members overlie a top side of said ballast channel and said side walls overlie said open ends of said ballast channel.

* * * * *